(12) United States Patent
Eller et al.

(10) Patent No.: US 10,889,067 B1
(45) Date of Patent: Jan. 12, 2021

(54) TENSION-WOUND SOLID STATE ADDITIVE MANUFACTURING

(71) Applicant: Lockheed Martin Corporation, Bethesda, MD (US)

(72) Inventors: Michael R. Eller, New Orleans, LA (US); Randy J. Brown, Slidell, LA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 134 days.

(21) Appl. No.: 15/096,026

(22) Filed: Apr. 11, 2016

Related U.S. Application Data

(60) Provisional application No. 62/146,837, filed on Apr. 13, 2015.

(51) Int. Cl.
| | |
|---|---|
| *B33Y 10/00* | (2015.01) |
| *B29C 67/00* | (2017.01) |
| *B29C 31/04* | (2006.01) |
| *B33Y 30/00* | (2015.01) |
| *B23K 20/12* | (2006.01) |
| *B23K 20/10* | (2006.01) |

(52) U.S. Cl.
CPC ........ *B29C 67/0081* (2013.01); *B29C 31/042* (2013.01); *B23K 20/10* (2013.01); *B23K 20/122* (2013.01); *B33Y 10/00* (2014.12); *B33Y 30/00* (2014.12)

(58) Field of Classification Search
CPC ... B29C 69/004; B29C 67/0088; B29C 64/00; B29C 64/10; B29C 64/20; B29C 64/40; B29C 64/245; B29C 65/0681; B29C 65/08; B33Y 10/00; B33Y 30/00; B33Y 50/02; B33Y 40/00
USPC ............... 228/173.1, 173.4, 173.5
See application file for complete search history.

(56) References Cited

U.S. PATENT DOCUMENTS

| | | | | |
|---|---|---|---|---|
| 2,004,409 | A * | 6/1935 | Hopkins | B21F 27/10 140/112 |
| 2,600,630 | A * | 6/1952 | Boscawen | B23K 9/0325 220/591 |
| 3,095,156 | A * | 6/1963 | Warnken | B29C 53/581 242/437 |
| 3,141,806 | A * | 7/1964 | Reinman | B29C 70/00 156/425 |
| 3,162,012 | A * | 12/1964 | Blaze | F02K 9/64 60/267 |

(Continued)

*Primary Examiner* — Erin B Saad
*Assistant Examiner* — Carlos J Gamino
(74) *Attorney, Agent, or Firm* — Morgan, Lewis & Bockius LLP (57) ABSTRACT

A manufacturing system includes a tension-wound system having a feedstock system and a shape fixture. The tension-wound system is configured to feed a feedstock from the feedstock system and to wind the feedstock under tension in successive layers around the shape fixture to allow the feedstock to form a component having a shape represented by the shape fixture. The manufacturing system includes a solid-state joining tool configured to additively join the successive layers of the feedstock. In a spiral tension-winding process, with a continuously-fed strip of aluminum feedstock around a piece of tooling, the feedstock can be friction stir welded and additively joined in successive layers to produce a large, near-net structure.

12 Claims, 8 Drawing Sheets

(56) References Cited

U.S. PATENT DOCUMENTS

| | | | | |
|---|---|---|---|---|
| 3,313,671 A * | 4/1967 | Ritchie | B29C 53/60 | 156/425 |
| 3,379,385 A * | 4/1968 | Osweiler | B28B 23/14 | 242/438 |
| 3,549,077 A * | 12/1970 | Huck | B21D 49/00 | 138/154 |
| 3,728,189 A * | 4/1973 | Hannes et al. | B29C 70/525 | 156/173 |
| 3,785,409 A * | 1/1974 | Smith, III | B21F 27/124 | 140/92.2 |
| 3,920,170 A * | 11/1975 | Colburn | B21F 27/124 | 228/5.1 |
| 4,066,202 A * | 1/1978 | Binard | B21F 27/18 | 140/112 |
| 4,148,121 A * | 4/1979 | Butter | B21D 11/06 | 228/173.4 |
| 4,295,592 A * | 10/1981 | Schafer | B23K 9/0325 | 228/17 |
| 4,323,756 A * | 4/1982 | Brown | B22F 3/006 | 219/121.66 |
| 4,517,436 A * | 5/1985 | Lawrence | B23K 26/0838 | 219/121.68 |
| 4,585,156 A * | 4/1986 | Raley | B23P 15/16 | 228/132 |
| 4,615,471 A * | 10/1986 | Schurmeier | B22D 41/28 | 222/598 |
| 5,064,491 A * | 11/1991 | Huvey | B29C 70/205 | 156/173 |
| 5,069,382 A * | 12/1991 | Misiak | B21C 37/122 | 228/146 |
| 5,137,223 A * | 8/1992 | Brandon | B23K 15/002 | 226/187 |
| 5,447,822 A * | 9/1995 | Hull | B29C 64/135 | 430/269 |
| 5,568,882 A * | 10/1996 | Takacs | G01F 23/168 | 222/155 |
| 5,857,516 A * | 1/1999 | Jordison | F26B 17/128 | 165/157 |
| 6,054,103 A * | 4/2000 | Mandel | B01F 7/246 | 422/208 |
| 6,089,493 A * | 7/2000 | Moore | B21C 47/003 | 242/418.1 |
| 6,185,841 B1 * | 2/2001 | Conochie | C10L 9/08 | 34/337 |
| 6,249,989 B1 * | 6/2001 | Conochie | B01J 8/0285 | 34/337 |
| 6,436,298 B1 * | 8/2002 | Parkinson | B04C 5/08 | 210/744 |
| 6,457,629 B1 * | 10/2002 | White | B23K 20/10 | 228/112.1 |
| 6,460,757 B1 * | 10/2002 | Ommundsen | B07B 1/4618 | 228/141.1 |
| 6,484,964 B1 * | 11/2002 | Cooper | B21C 47/18 | 242/559.1 |
| 6,814,823 B1 * | 11/2004 | White | B23K 11/0013 | 156/73.1 |
| 7,261,542 B2 * | 8/2007 | Hickerson | B29C 64/379 | 425/174.4 |
| 9,027,820 B2 * | 5/2015 | Heck | B32B 15/14 | 228/112.1 |
| 9,346,116 B2 * | 5/2016 | Guldberg | B22F 3/1055 | |
| 9,694,544 B2 * | 7/2017 | Mark | G05B 15/02 | |
| 9,764,514 B2 * | 9/2017 | Albert | B29C 47/92 | |
| 9,849,631 B1 * | 12/2017 | Goss | B29C 64/241 | |
| 9,975,295 B2 * | 5/2018 | Rolland | B33Y 10/00 | |
| 9,987,707 B2 * | 6/2018 | Dong | B33Y 70/00 | |
| 10,479,033 B2 * | 11/2019 | Dodds | B29C 70/527 | |
| 2003/0192941 A1 * | 10/2003 | Ishida | B23K 20/123 | 228/112.1 |
| 2004/0107019 A1 * | 6/2004 | Keshavmurthy | G05B 19/4097 | 700/118 |
| 2007/0119906 A1 * | 5/2007 | Mika | B23K 20/1245 | 228/112.1 |
| 2007/0122562 A1 * | 5/2007 | Adams | B22F 3/1055 | 427/532 |
| 2009/0152328 A1 * | 6/2009 | Okamoto | B23K 20/14 | 228/112.1 |
| 2009/0189007 A1 * | 7/2009 | Cooper | B21F 15/08 | 242/434.7 |
| 2012/0241419 A1 * | 9/2012 | Rumsby | B23K 26/0846 | 219/121.6 |
| 2012/0279441 A1 | 11/2012 | Creehan et al. | | |
| 2013/0273749 A1 * | 10/2013 | Mizumura | B23K 26/0676 | 219/121.65 |
| 2014/0110593 A1 * | 4/2014 | Lacy | B23K 31/027 | 250/390.01 |
| 2014/0174344 A1 | 6/2014 | Schultz et al. | | |
| 2015/0129119 A1 * | 5/2015 | Askan | B29C 70/386 | 156/212 |
| 2015/0165554 A1 * | 6/2015 | Voice | B23K 26/1476 | 219/74 |
| 2015/0290711 A1 * | 10/2015 | Norfolk | B23K 35/0255 | 425/78 |
| 2015/0352794 A1 * | 12/2015 | Nguyen | G06F 17/5018 | 700/98 |
| 2016/0068678 A1 * | 3/2016 | Luo | C08L 75/04 | 264/308 |
| 2016/0271876 A1 * | 9/2016 | Lower | B29C 64/386 | |
| 2017/0232518 A1 * | 8/2017 | Shi | B22F 3/105 | 419/7 |
| 2017/0274585 A1 * | 9/2017 | Armijo | B33Y 10/00 | |
| 2017/0297097 A1 * | 10/2017 | Gibson | B33Y 70/00 | |

* cited by examiner

TENSION-WOUND SOLID STATE ADDITIVE MANUFACTURING

CROSS-REFERENCE TO RELATED APPLICATIONS

This application claims the benefit of U.S. Provisional Application No. 62/146,837, entitled "TENSION-WOUND SOLID STATE ADDITIVE MANUFACTURING," filed Apr. 13, 2015, which is incorporated herein by reference in its entirety.

TECHNICAL FIELD

The present description relates in general to additive manufacturing, and more particularly to, for example, without limitation, tension-wound solid state additive manufacturing.

BACKGROUND

Friction stir welding is used as a solid-state joining method for structures, including large-aluminum spaceflight structures. Additive manufacturing, or 3-D printing, is increasingly being used in place of traditional wrought product joining, however, additive manufacturing of aluminum involves bringing material (e.g., wire, powder, etc.) into a molten state so it can be deposited in a desired profile. The melting involved in this process produces larger grain sizes and inferior mechanical properties when compared to wrought products and wrought product welds made with solid state processes such as friction stir welding.

The description provided in the background section should not be assumed to be prior art merely because it is mentioned in or associated with the background section. The background section may include information that describes one or more aspects of the subject technology.

SUMMARY

One or more implementations of the present disclosure provide a tension-wound solid-state additive manufacturing system, which includes: a tension-wound system comprising a feedstock system and a shape fixture, the tension-wound system configured to feed a feedstock from the feedstock system and to wind the feedstock under tension in successive layers around the shape fixture to allow the feedstock to form a component having shape represented by the shape fixture; and a solid-state joining tool configured to additively join the successive layers of the feedstock.

One or more implementations of the present disclosure provide a method of solid-state additive manufacturing using a system including a feedstock system, a shape fixture, and a solid-state joining tool. The method includes: feeding a feedstock from the feedstock system; winding the feedstock under tension in successive layers around the shape fixture; and additively joining, using the solid-state joining tool, the successive layers of the feedstock.

The description in this summary section may provide some illustrative examples of the disclosure. This section is not intended to be a broad overview or to identify essential elements of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

A method for solid state additive manufacturing may be performed in an environmentally-controlled chamber. For example, solid state additive manufacturing using materials such as aluminum, titanium, and other metals, may be conducted within a vacuum chamber. However, this method is not advantageous for fabricating large parts, e.g., large spaceflight hardware, because the size of the parts that can be produced is limited. In some aspects, the size of the part is limited by the size of the chamber within which the part is fabricated. Use or creation of a larger chamber presents additional challenges, including increased expense. Furthermore, additively manufactured parts have inferior mechanical properties when compared to wrought products because of the melting involved.

Other solid state additive manufacturing methods such as Additive Friction Stir (AFS), Ultrasonic Consolidation (UC), and/or Cold Spray Deposition (CSD) may improve mechanical properties. However, these methods typically require expensive tooling and machinery, and do not produce substantially large structures. Furthermore, when attempting to use these methods to produce an extreme number of additive layers, e.g., more than 100 layers, it will be very difficult to control and guarantee that the deposition layers are consistent from the $1^{st}$ layer to the $N^{th}$ layer. These processes must have a significant level of control over the feed rate of the material to guarantee consistency at every layer. Thus, applying the process to complex profiles or large structures requires intermittent and customized process controls on the feed rate to prevent too little or too much material from being fed into the deposition layers. Further, these processes do not provide a method for consistently supplying a continuous feeds of material sufficient to produce large structures.

Therefore, the solid-state additive manufacturing techniques described above still have issues with scaling the process up to produce large structures. Accordingly, no entity has attempted to make large spaceflight structures such as domes, barrels, fairings, etc.

One or more aspects of the subject technology provide a spiral tension-winding process, with a continuously-fed strip of aluminum feedstock around a piece of tooling, that is friction stir welded to a substrate below and additively joined in successive layers to produce a large, near-net structure. For example, an aluminum sheet, plate, or strip is fed into a friction stir tool and spiral wound against a shape fixture representing a desired near-net shape, such as a dome, cone, fairing, etc. The aluminum strip may be pulled in tension from a spool toward a solid-state joining tool such as a friction stir welding tool. An aluminum strip may be friction stir welded layer-by-layer continuously against the shape fixture such that each layer of the aluminum strip has 100% overlap of the friction stir welding nugget zone between the respective layers.

According to various aspects of the subject technology, commercial off-the-shelf wrought sheet/strip material can be used as the feed material instead of costly powders or specialty wires. A system using coiled feed material is less expensive and promotes better deposition rates than powders or wires. Aspects of the subject technology enables the use of high-strength alloys, such as aluminum-lithium or aluminum-zinc, where traditional melting additive manufacturing techniques would vaporize the lithium and zinc strengthening agents. The subject technology permits a consistent feedstock additive layer thickness to be maintained due to tight dimension tolerances of the feedstock and a high-level of process control over the friction stir welding process.

Figure 1:
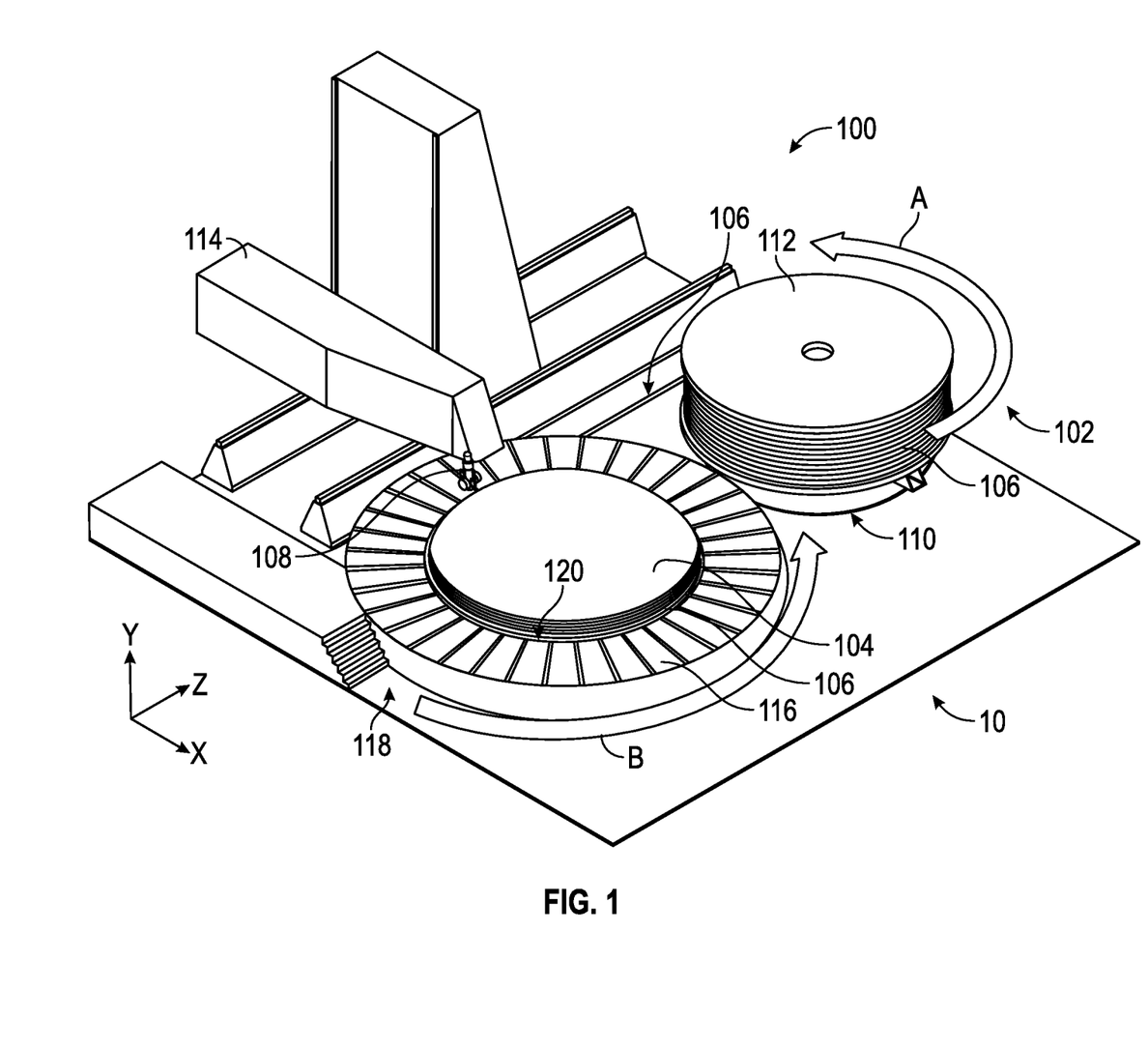
FIG. 1 illustrates a perspective view of an example of a tension-wound solid state additive manufacturing system.

FIG. 1 illustrates a perspective view of a tension-wound solid state additive manufacturing system 10 comprising a tension-wound system 100, which includes a feedstock system 102 and a shape fixture 104. In some embodiments, the tension-wound system 100 is configured to feed a feedstock 106 from the feedstock system 102 toward the shape fixture 104. In an implementation, the feedstock 106 is wound under tension in successive layers around the shaped fixture 104. In some aspects, the feedstock 106 is wound around a surface the shape fixture 104 such that the feedstock 106 is formed into a shape corresponding to the shape fixture 104.

The tension-wound solid state additive manufacturing system 10 may also include a solid-state joining tool 108, which additively joins the successive layers of feedstock 106 fed from the feedstock system 102. The solid-state joining tool 108 may be a friction stir welding tool, an ultrasonic consolidation tool, or another solid-state joining tool.

In some embodiments of the tension-wound solid-state additive manufacturing system 10, the feedstock system 102 is rotatable. For example, the feedstock system 102 is rotatable about an axis in a direction represented by arrow A. In some embodiments, the feedstock system 102 comprises a tension motor 110. The tension motor 110 is configured to control tension of the feedstock between the feedstock system 102 and the shape fixture 104. The tension motor 110 may be a stepper motor.

In some aspects of the present disclosure, the feedstock system 102 includes a spool of aluminum strip, and the feedstock 106 may be a strip or sheet of aluminum wound on a spool 112. As the tension wound system 100 feeds the feedstock 106 toward the shape fixture 104, the spool 112 rotates. The tension motor 110 provides tension of the feedstock 106 relative to the shape fixture 104. The tension motor 110 is coupled to the spool 112. In one or more implementations, continuous additive fabrication of a large structure is enabled, but can also be stopped and started when necessary to add a new spool 112 of feedstock 106.

In some embodiments, the solid-state joining tool 108 is movable relative to the shape fixture 104. For example, the solid-state joining tool 108 is movable in the X, Y, and/or Z axes. In some implementations of the present disclosure, movement of the solid-state joining tool 108 corresponds to a position of the feedstock 106 at the shape fixture 104. Thus, in an implementation, the solid-state joining tool 108 is configured to move along a cross-sectional profile of the shape fixture 104 (e.g., x-y axes) and join the feedstock 106, being fed toward the shape fixture 104, in successive layers. In some examples, the solid-state joining tool 108 is coupled to a boom 114. The boom 114 is configured to position the solid-state joining tool 108 adjacent to the shape fixture 104 to permit joining of the feedstock 106. In some aspects, the boom 104 is configured to move the solid-state joining tool 108 in relation to the shape fixture 104.

In some aspects of the tension-wound solid-state additive manufacturing system 10, the tension-wound system 100 comprises a rotatable table 116. In some configurations, the shape fixture 104 is positioned on the rotatable table 116 such that movement of the rotatable table 116 corresponds to movement of the shape fixture 104. In some examples, a rotatable table 116 spins a shape fixture 104 to permit the feedstock 106 to wind onto the shape fixture 104. In other examples, the feedstock 106 and the solid-state joining tool 108 may move together such that the feedstock 106 and solid-state joining tool 108 circumnavigate the shape fixture 104, and the tension-wound system 100 may self-feed the feedstock 106 directly in front of the tool's path. The solid-state joining tool 108 may be a friction stir welding or ultrasonic consolidation tool.

In some embodiments, the rotatable table 116 comprises a drive motor 118 (under the table). The drive motor 118 is configured to direct movement of the rotatable table 116. In some embodiments, the drive motor 118 is configured to control tension of the feedstock between the feedstock system 102 and the shape fixture 104. In an example, the drive motor 118 directs the rotatable table 116 and shape fixture 104 to rotate about an axis in a direction represented by arrow B. In some configurations, the feedstock system 102 and the rotatable table 116 rotate as the solid-state joining tool additively joins feedstock 106, fed from the feedstock system 102 toward the shape fixture 104, into successive layers.

Some aspects of the present disclosure provides a feedback system configured to receive feedback from the tension-wound solid-state additive manufacturing system. In some aspects, feedback is received from the tension motor 110 and the drive motor 118. In an example, the feedback system, directs the tension motor 110 and the drive motor 118 to maintain a specified tension between the feedstock system 102 and the rotatable table 116. In an aspect, the feedback system maintains tension of the feedstock along the entire profile of the shape fixture. In some aspects, the feedback system maintains a feed rate of the feedstock to the shape fixture.

Figure 2:
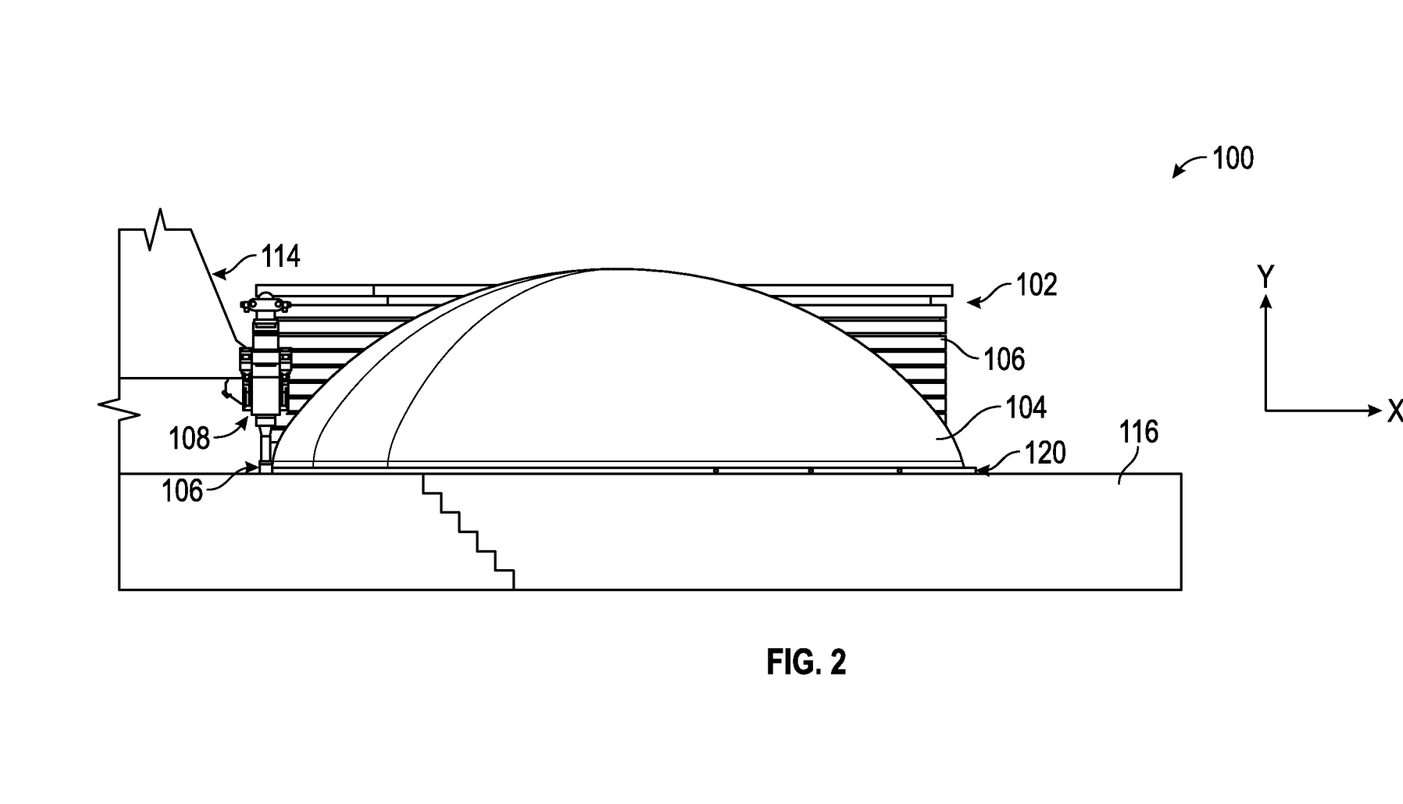
FIG. 2 illustrates an example of a side view of the tension-wound solid state additive manufacturing system of FIG. 1.

FIG. 2 illustrates an example of a side view of the tension-wound solid state additive manufacturing system 10. The feedstock system 102 comprises a strip or sheet of feedstock 106 wound on the spool 112. In some aspects of the subject technology, a substrate ring 120 is located around a bottom portion of the shape fixture 104. Referring to FIGS. 1 and 2, in some aspects, the substrate ring 120 is coupled to the rotatable table 116 adjacent to the bottom portion of the shape fixture 104 such that the substrate ring 120 moves with the rotatable table 116 and the shape fixture 104. In some implementations, the substrate ring 120 is configured to receive a first portion of the feedstock 106 such that movement of the substrate ring 120 draws the feedstock 106 toward the shape fixture 104. In some implementations, the solid-state joining tool 108 is positioned by the boom 114 to additively join successive layers of the feedstock 106 drawn toward the shape fixture 104. According to various aspects of the subject technology, a consistent heat sink across the entire build profile is maintained by using a starting substrate ring and a shape fixture that is designed to be an effective heat sink anywhere on the profile.

Figure 3A:
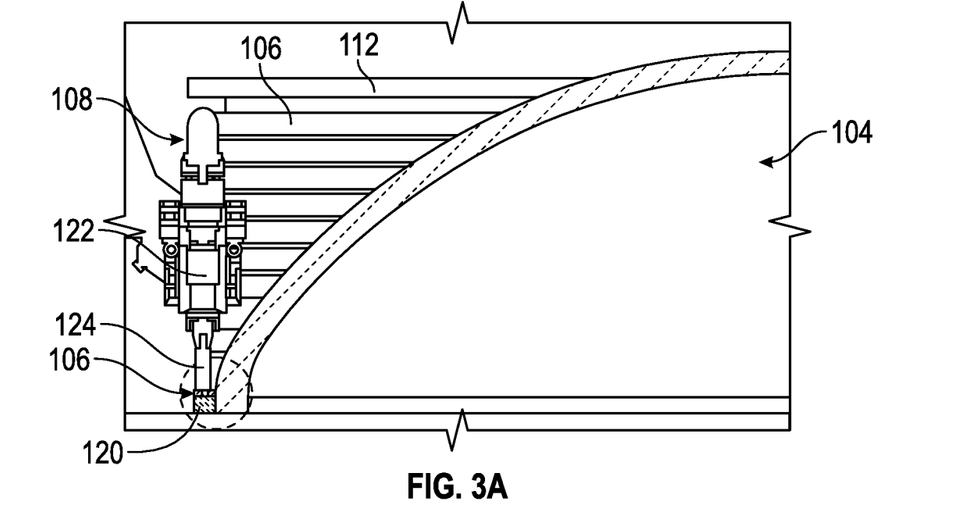
FIG. 3A illustrates an example of a side section view of the tension-wound solid state additive manufacturing system of FIG. 1.
Figure 3B:
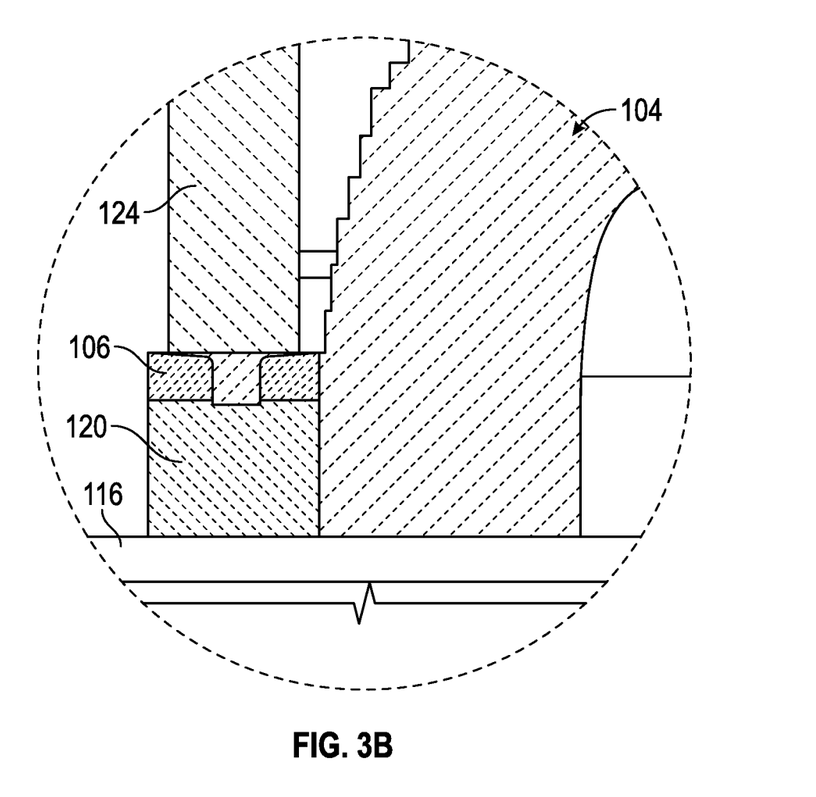
FIG. 3B illustrates an example of a detail view of the tension-wound solid state additive manufacturing system of FIG. 3A.

FIGS. 3A-3B illustrate examples of side section views of the tension-wound solid state additive manufacturing system 10. Referring to FIG. 3A, the solid-state joining tool 108 includes a head 122 and a pin tool 124. The solid-state joining tool 108 is positioned adjacent to the shape fixture 104 and the substrate ring 120. Referring to FIG. 3B, a first portion or 1$^{st}$ layer of the feedstock 160 is joined to the substrate ring 120 by the solid-state joining tool. In some aspects, the solid-state joining tool friction stir welds a 1$^{st}$ layer of the feedstock 160 to the substrate ring 120. During friction stir welding, a portion of the pin tool 124 extends through the feedstock 106.

Figure 4A:
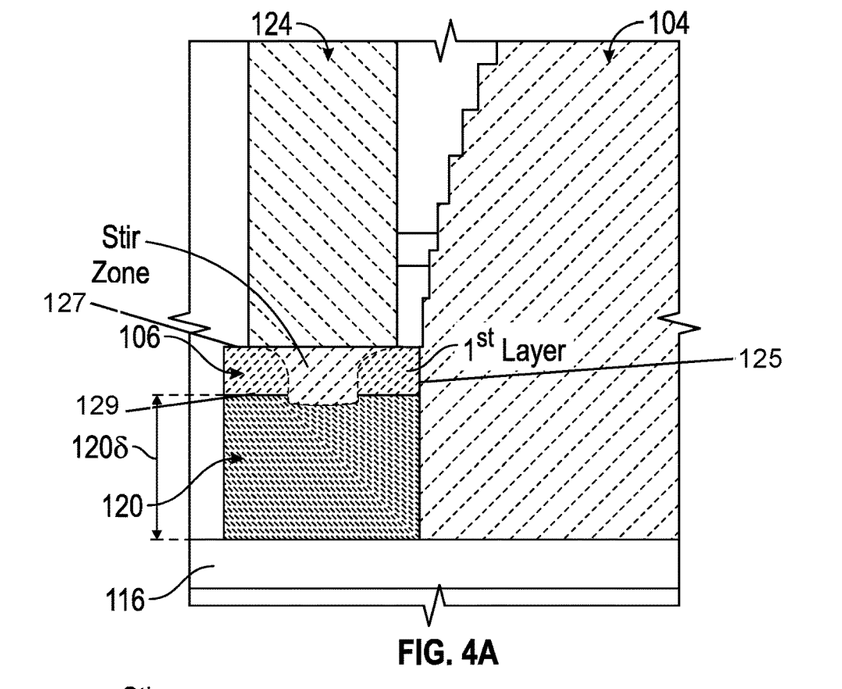
FIGS. 4A-4B illustrate examples of side section views of the tension-wound solid state additive manufacturing system of FIG. 3A.
Figure 4B:
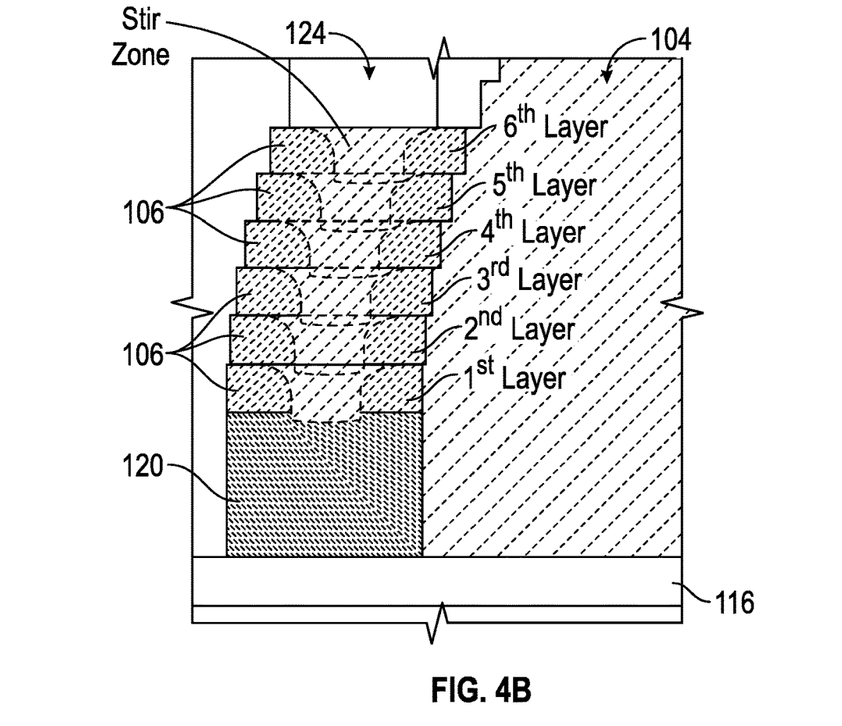

FIGS. 4A-4B illustrate examples of side section views of the tension-wound solid state additive manufacturing system 10. The feedstock 106 is positioned such that a bottom surface 129 of the feedstock 106 is engaged against a top surface of the substrate ring 120, and an inner, or side surface 125 of the feedstock 106 is engaged against an outer surface of the shape fixture 104. In some aspects, the substrate ring 120 comprises a varying depth 120d between a top surface and a bottom surface. In some configurations, the depth 120d increases along a length of the substrate ring 120 such that each layer of feedstock 106 joined to the substrate ring 120 is parallel with the rotatable turntable 116.

During friction stir welding, the pin tool 124 is engaged against a top surface 127 of the feedstock 106 and creates a stir zone that extends through a portion of a 1st layer of the feedstock 106 and the substrate ring 120, thereby joining the 1st layer of the feedstock 106 to the substrate ring 120. As the shape fixture 104 is rotated, feedstock 106 is continuously fed from the feedstock system 102, creating subsequent layers of feedstock 106, e.g., 2nd layer through 6th layer.

In some aspects, a cross-sectional width of the shape fixture 104 decreases from the bottom towards the top of the shape fixture 104. For example, the shape fixture 104 may have a dome or cone shape profile. In an aspect, the outside surface of the shape fixture 104 includes steps, notches, or a spiral groove. As the feedstock 106 is continuously fed toward the shape fixture 104, each layer is engaged against an adjacent notch. Thus, each layer of feedstock 106 is laterally offset from the previous layer. In some aspects, a layer of the feedstock 160 overlaps the previous layer such that a portion of each layer extends beyond the adjoining layer and extends into the notch of the shape fixture 104.

As the feedstock 106 is fed toward the shape fixture 104 into successive layers, the solid-state joining tool is moved so that the pin tool 124 is engaged against the top surface of the top most layer of feedstock 106. The feedstock 106 is friction stir welded as it is fed to the shape fixture 104. The stir zone of each layer of feedstock 106 is positioned through the portion of the feedstock 106 that overlaps and engages against the layer immediately beneath such that the stir zone extends through the top layers of feedstock 106 and into the layer immediately beneath. The friction stir welding process creates a weld nugget, having a cross-sectional length W, in the stir zone. In some aspects, the weld nugget through the feedstock 106 comprises a cross-sectional length of 0.320 inch. In some implementations of the subject technology, a 100% overlap of the friction stir weld nugget between feedstock 106 layers is achieved along complex profiles such as domes, barrels, fairings, etc. The joined layers of feedstock 106 results in a near-net shape component 200 having a cross-sectional profile corresponding to the shape fixture.

Figure 5:
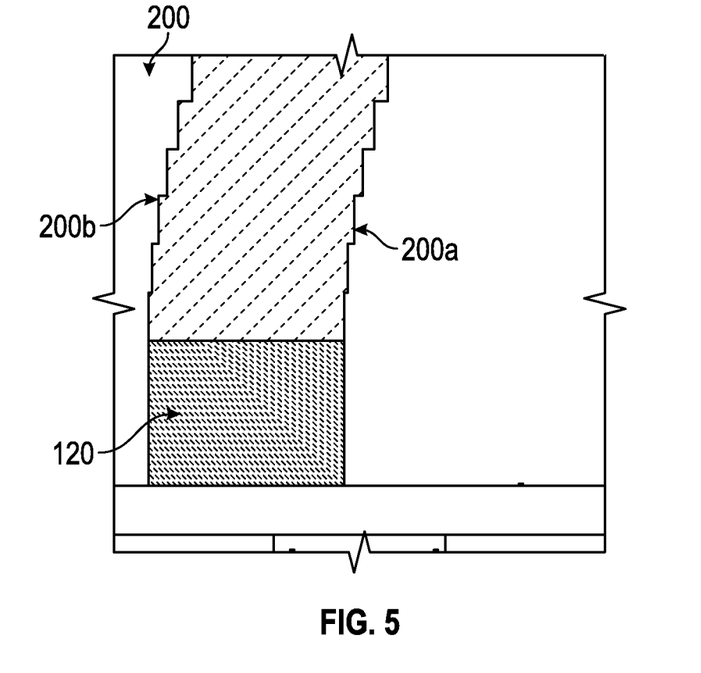
FIG. 5 illustrates a side section view of an example of a near-net shape component.

FIG. 5 illustrates a side section view of an example of a near-net shape component 200 coupled to the substrate ring 120 with the shape fixture removed. The inside surface 200a and outside surface 200b of the near-net shape component 200a form a "step" as a result of the successive layers of feedstock being formed against the dome shaped outside surface of the shape fixture. In some implementations of the subject technology, the near-net shape component 200 is machined on the inside and outside surfaces on a large turning or milling tool to bring the component to a net shape, which is shown in FIG. 6.

Figure 6:
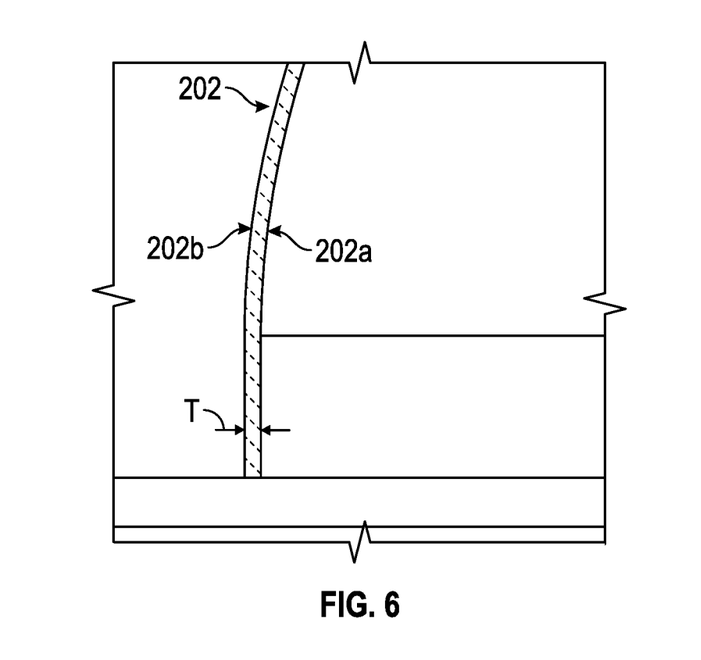
FIG. 6 illustrates a side section view of an example of a net shape component.

FIG. 6 illustrates a side section view of an example of a net shape component 202. In some aspects, the net shape component 202 comprises a smooth inside surface 202a and a smooth outside surface 202b. The net shape component 200 comprises a cross-sectional length T between the inside surface 202a and outside surface 202b. In some aspects, the cross-sectional length T of the net shape component 200b corresponds to the cross-sectional length W of the weld nugget. For example, a near-net shape component 200 comprising a weld nugget having a cross-sectional length of 0.320 inch results in a net shape component 202 comprising a cross-sectional length of 0.320 inch.

In some aspects, the near-net shape component 200 or the net shape component 202 is cold formed with spin forming equipment to provide desirable mechanical properties. In one or more implementations, low-temperature post weld artificial aging methods are utilized provide desirable mechanical properties and avoid or reduce undesirable grain growth. In some implementations, aluminum-lithium alloys such as 2050, 2060, and 2070 can be integrated for advantageous, "as friction stirred," properties, e.g., without additional treatment.

In one or more implementations, after the feedstock 106 is deposited into a near-net shape structure (e.g., the near-net shape component 200, which may be, for example, a near-net dome, barrel, etc.), the near-net shape structure is machined into a net shape structure (e.g., the net shape component 202). This net shape structure, however, lacks the "cold work" that is put into traditionally-manufactured dome/barrel products made from rolled plate or forgings. Thus, in one or more implementations, a spin forming process may be applied. Applying the spin forming process to a structure (e.g., the near-net shape component 200 or the net shape component 202) adds mechanical work and can provide many benefits. Spin forming a structure or a component can provide control over grain size and abnormal grain growth and produce desirable properties in the net shape structure (e.g., the net shape component 202). Desirable properties can include improved mechanical properties (e.g., improved ductility and toughness) and improved geometric tolerances of the net shape structure.

Figure 7A:
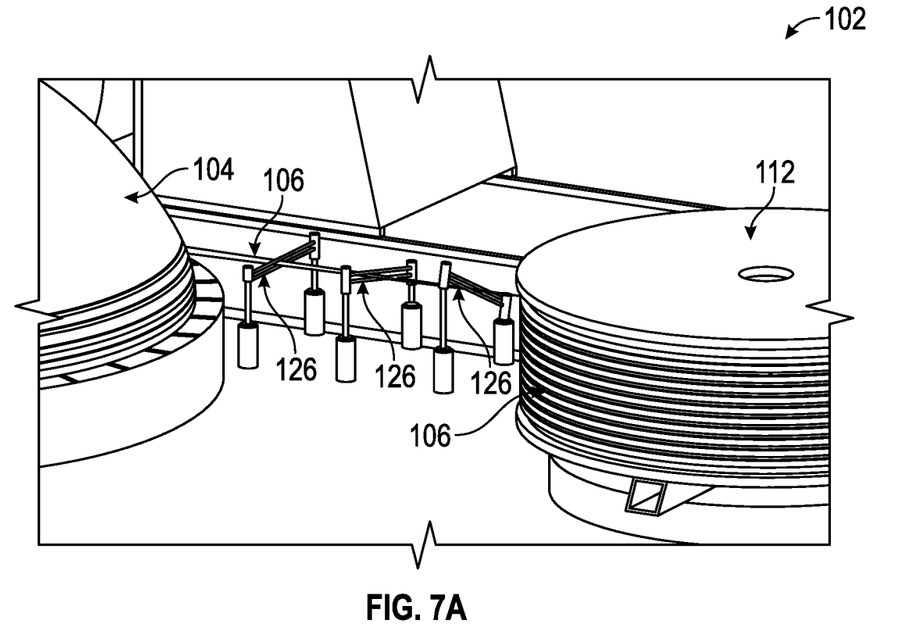
FIGS. 7A-7B illustrate examples of perspective views of the tension-wound solid state additive manufacturing system of FIG. 1.
Figure 7B:
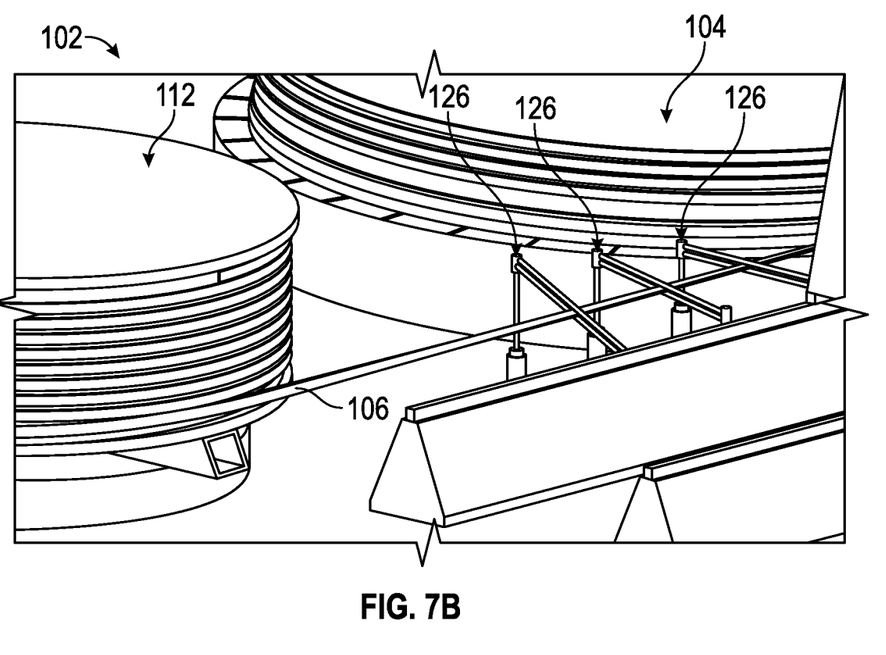

Referring to FIGS. 7A-7B, some configurations of the tension-wound system 100 include at least one guide 126 positioned between the feedstock system 102 and the shape fixture 104. The at least one guide 126 is configured to direct the feedstock 106, received from the feedstock system 102, to the shape fixture 104. In some aspects, the at least one guide 126 is moveable to permit the feedstock 106 to be directed toward a top most layer of the shape fixture 104. In another aspect, the at least one guide 126 changes the orientation of the feedstock 106 fed to the shape fixture 104. In an example, the feedstock 106 is wrapped around a spool 112 with the longest cross-sectional length in a vertical orientation. The feedstock 106 is directed to a horizontal orientation by the at least one guide 126 between the spool 112 and the shape fixture 104. In some configurations, the at least one guide 126 comprises a pair of elongated rollers to allow the feedstock 106 to be received between the pair of elongated rollers. The elongated rollers permit movement of the feedstock 106 along the length of each roller. In a configuration, three guides, including three pairs of elongate rollers, are positioned between the spool 112 and the shape fixture 104 such that each of the three guides directs the orientation and position of the feedstock 106.

Figures 8, 9A, 9B, 9C:
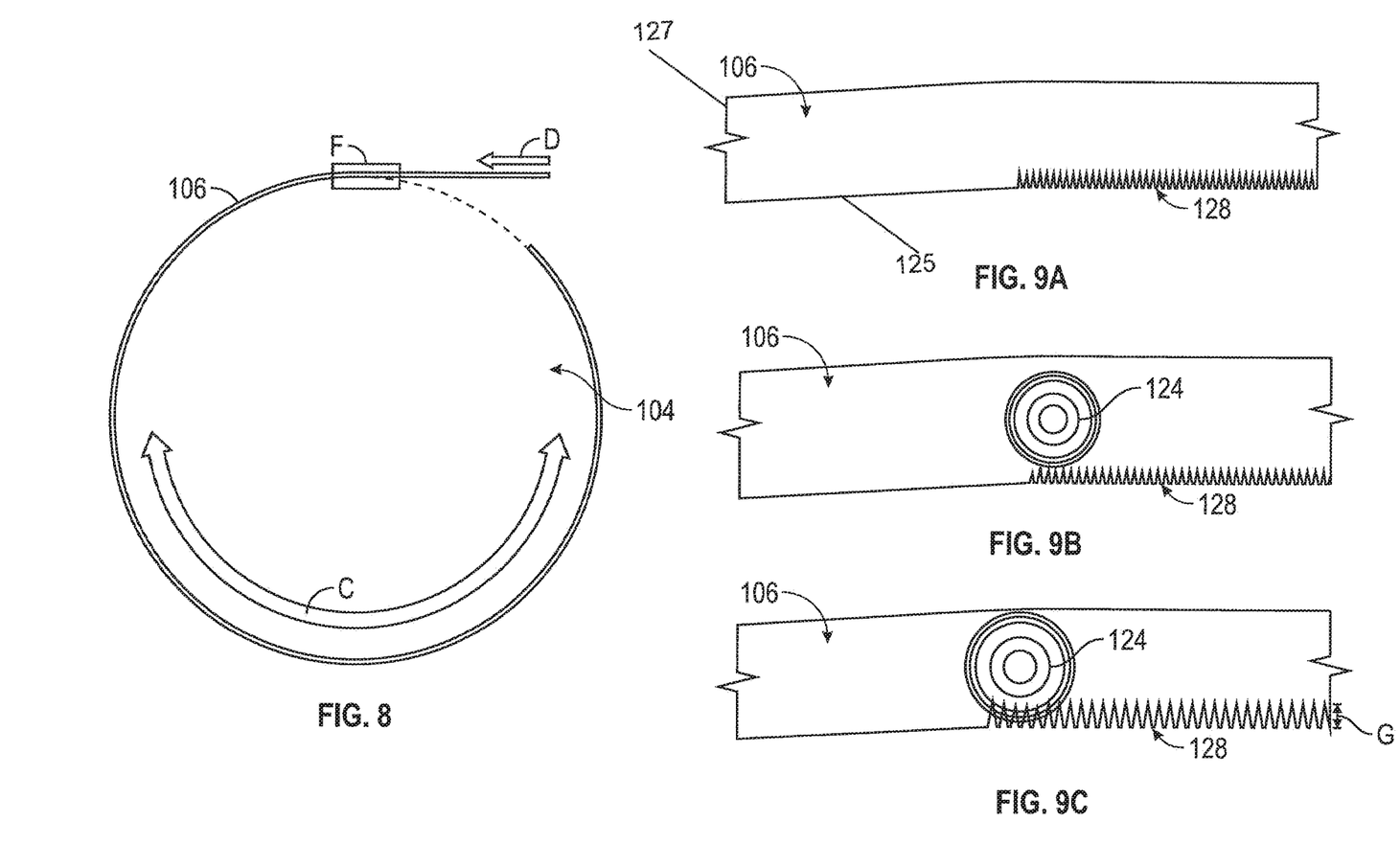
FIG. 8 illustrates a schematic view of an example of a movement of a feedstock.
FIGS. 9A-9C illustrate examples of section views of a feedstock.

FIG. 8 is an example of a schematic view of the feedstock 106 as it is drawn toward and around a shape fixture 104. In an example, the feedstock 106 is coupled to the shape fixture 104 or a substrate ring that rotates in a counter-clockwise direction represented by arrow C. As the shape fixture 104 rotates, the feedstock 106 engages the shape fixture 104 at zone F and is drawn toward the shape fixture 104 in the direction of arrow D.

FIGS. 9A-9B illustrate examples of section views of the feedstock 106. Referring to FIG. 9A, in some aspects of the subject technology, the feedstock 106 includes relief cuts or one or more grooves 128 extending between the top surface 127 and the bottom surface 129 of the feedstock 106. In some configurations, the one or more grooves 128 are punched or cut into a side surface of the feedstock 106. In another configuration, the one or more grooves 128 are located on an inside side surface of the feedstock 106 configured to engage the shape fixture, thereby permitting the inside side surface 125 of the feedstock 106 to be directed into a concaved or convex shape profile. Referring to FIG. 9B, in some embodiments, the pin tool 124 is positioned between side surfaces of the feedstock 106 such that the stir zone is separated from and does not overlap or interfere with the one or more grooves 128. Referring to FIG. 9C, in some embodiments, the pin tool 124 is positioned between side surfaces of the feedstock 106 such that the stir zone overlaps or includes the one or more grooves 128. In some aspects, the one or more grooves 128 have a depth G such that the stir zone overlaps or includes the one or more grooves 128.

Figure 10A:
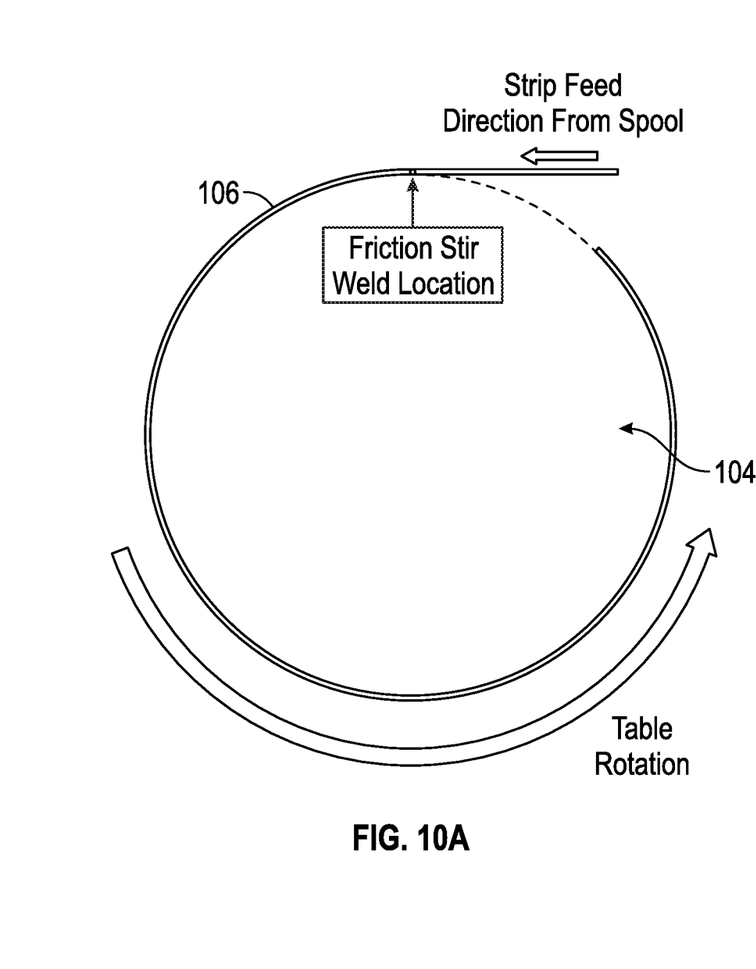
FIGS. 10A-10B illustrate schematic views of examples of welding locations.
Figure 10B:
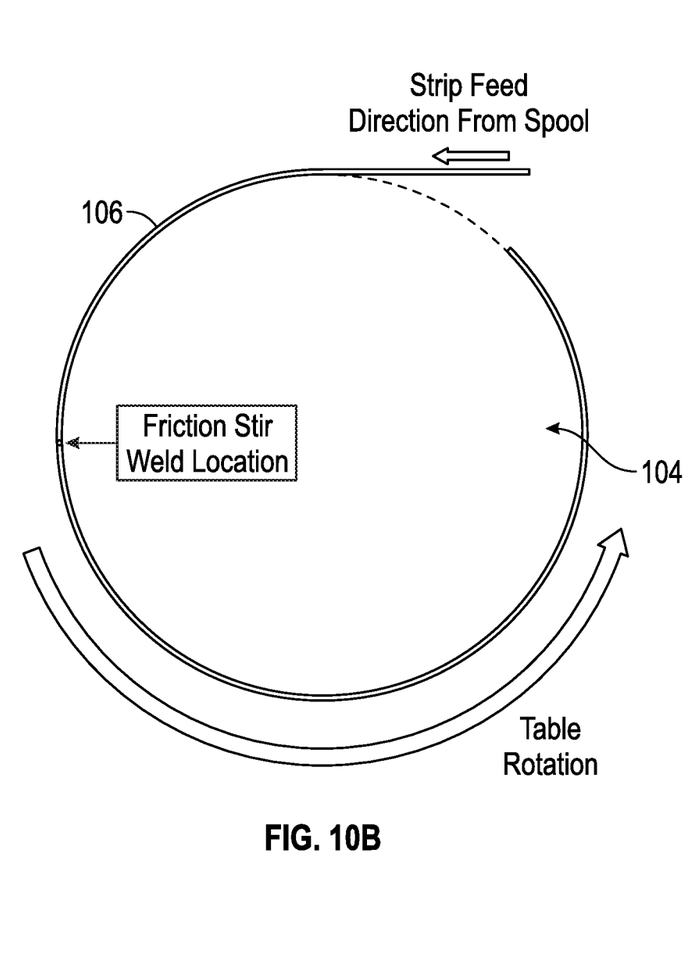

FIGS. 10A-10B are schematic views illustrating examples of positions where friction stir welding occurs as the feedstock 106 is drawn to the shape fixture 104 by movement of the rotatable table 116. Referring to FIG. 10A, in some embodiments, the friction stir welding location is before the feedstock 106 begins to curve around the tooling fixture 104.

Referring to FIG. 10B, in some embodiments, the friction stir welding location is after the feedstock 106 begins to curve around the tooling fixture 104.

FIGS. 1 through 10B illustrate examples of a tension-wound feedstock in conjunction with friction stir welding; however, other solid-state techniques can be used instead of the friction stir welding pin tool method shown. For example, one or more implementations include using an ultrasonic consolidation method which uses a rotating cylindrical sonotrode to apply high-frequency vibrations to join successive layers of the feedstock. In some implementations, feedstock is fed axially through a bore of a rotating friction stir welding tool such that it is deposited in the wake of the translating tool. This process can be used in conjunction with the subject technology to produce near-net and net shape structures. The present disclosure can be used for all metals, polymers, composites, ceramics, and nanomaterials. Additionally, one or more aspects of the subject technology are most applicable for radially symmetric structures that can be easily turned on a radial turntable; however, non-radially symmetric structures can also be fabricated with good design practice.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one of Jonathan, or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A tension-wound solid-state additive manufacturing system, comprising:
a tension-wound system comprising a feedstock system and a shape fixture, the tension-wound system configured to feed a feedstock from the feedstock system and to wind the feedstock under tension in successive layers around the shape fixture to allow the feedstock to form a shape represented by the shape fixture, the shape fixture having an outside surface defining a plurality of laterally offset notches, wherein each layer of the feedstock is disposed against an adjacent notch of the plurality of laterally offset notches and each layer of feedstock is laterally offset from a previous layer of the feedstock; and
a solid-state joining tool, at least a portion of which is configured to extend through the feedstock to additively join the successive layers of the feedstock.

2. The tension-wound solid-state additive manufacturing system of claim 1, wherein the feedstock system is rotatable, and the solid-state joining tool is movable relative to the shape fixture.

3. The tension-wound solid-state additive manufacturing system of claim 1, wherein the tension-wound system comprises a rotatable turntable, wherein the shape fixture is on the rotatable turntable.

4. The tension-wound solid-state additive manufacturing system of claim 3, wherein the rotatable turntable comprises a drive motor configured to direct movement of the rotatable turntable.

5. The tension-wound solid-state additive manufacturing system of claim 1, wherein the tension-wound system comprises at least one guide positioned between the shape fixture and the feedstock system, the at least one guide configured to direct the feedstock, received from the feedstock system, to the shape fixture.

6. The tension-wound solid-state additive manufacturing system of claim 5, wherein the at least one guide comprises a pair of elongated rollers to allow the feedstock to be received between the pair of elongated rollers.

7. The tension-wound solid-state additive manufacturing system of claim 1, wherein the feedstock comprises a first side surface, a top surface, and a bottom surface, the first side surface having one or more grooves extending between the top surface and the bottom surface.

8. The tension-wound solid-state additive manufacturing system of claim 1, comprising a substrate ring placed around a bottom portion of the shape fixture, the substrate ring configured to receive a first portion of the feedstock.

9. The tension-wound solid-state additive manufacturing system of claim 8, wherein the substrate ring comprises a varying depth between a top surface and a bottom surface, wherein the depth increases along a length of the substrate ring.

10. The tension-wound solid-state additive manufacturing system of claim 1, wherein the solid-state joining tool is a friction stir welding tool.

11. The tension-wound solid-state additive manufacturing system of claim 1, wherein the solid-state joining tool is an ultrasonic consolidation tool.

12. The tension-wound solid-state additive manufacturing system of claim 1, comprising a boom coupled to the solid-state joining tool, the boom configured to move the solid-state joining tool in relation to the shape fixture.

* * * * *